(12) United States Patent
Ryttersson (10) Patent No.: US 10,310,108 B2
(45) Date of Patent: Jun. 4, 2019

(54) BOW-SHAPED SPRING FOR MARINE VIBRATOR

(71) Applicant: PGS Geophysical AS, Oslo (NO)

(72) Inventor: Karl-Henrik Ryttersson, Vasteras (SE)

(73) Assignee: PGS Geophysical AS, Oslo (NO)

( * ) Notice: Subject to any disclaimer, the term of this patent is extended or adjusted under 35 U.S.C. 154(b) by 1025 days.

(21) Appl. No.: 14/309,948

(22) Filed: Jun. 20, 2014

(65) Prior Publication Data

US 2015/0185341 A1  Jul. 2, 2015

Related U.S. Application Data

(60) Provisional application No. 61/921,929, filed on Dec. 30, 2013.

(51) Int. Cl.
*G01V 1/04* (2006.01)
*G01V 1/38* (2006.01)

(52) U.S. Cl.
CPC . *G01V 1/04* (2013.01); *G01V 1/38* (2013.01)

(58) Field of Classification Search
CPC ..................................................... G10K 9/121
USPC ............................ 367/140–176, 15; 181/120
See application file for complete search history.

(56) References Cited

U.S. PATENT DOCUMENTS

| 3,258,738 A * | 6/1966 | Merchant | B06B 1/0618 367/155 |
| 5,155,709 A * | 10/1992 | Flanagan | G10K 9/121 29/25.35 |
| 5,701,277 A * | 12/1997 | Ring | G10K 9/121 310/337 |
| 5,757,726 A | 5/1998 | Tenghamn et al. | |
| 5,757,728 A | 5/1998 | Tenghamn et al. | |

(Continued)

OTHER PUBLICATIONS

HEXCEL, HexPly M9.1F/M9.6F Product Data Sheet, Mar. 2007. (2 pages).

(Continued)

*Primary Examiner* — Isam A Alsomiri
*Assistant Examiner* — Amie M Ndure (57) ABSTRACT

A spring member for marine vibrators. At least some illustrative embodiments are bow-shaped spring members including an outer surface, an inner surface; the outer and inner surfaces defining a thickness of the bow-shaped spring member. The bow-shaped spring member further includes first and second hinge members disposed on opposite ends of the bow-shaped spring member; a length defined between the first hinge member and the second hinge member; and a width defined along the first hinge member, the width in a range of from 50% to 150% of the length. The bow-shaped spring member also comprises a contour on the outer surface defined by a perpendicular section through the outer surface along the length, the contour including a medial portion having a curvature with a first algebraic sign; first and second peripheral portions abutting respective first and second hinge members, the first and second peripheral portions having a curvature with the first algebraic sign; and first and second intermediate portions disposed between respective first and second peripheral portions and the medial portion, the first and second intermediate portions having a curvature with a second algebraic sign opposite the first algebraic sign.

23 Claims, 11 Drawing Sheets

(56) References Cited

U.S. PATENT DOCUMENTS

| | | | |
|---|---|---|---|
| 5,959,939 A * | 9/1999 | Tengham | B06B 1/045 367/174 |
| 6,085,862 A | 7/2000 | Tenghamn | |
| 6,851,511 B2 * | 2/2005 | Tenghamn | G01V 1/155 181/121 |
| 7,551,518 B1 * | 6/2009 | Tenghamn | G01V 1/145 181/113 |
| 7,881,158 B2 | 2/2011 | Tenghamn | |
| 7,974,152 B2 | 7/2011 | Tenghamn | |
| 8,089,825 B2 | 1/2012 | Barr, Jr. et al. | |
| 8,094,514 B2 | 1/2012 | Tenghamn | |
| 8,102,731 B2 | 1/2012 | Cambois | |
| 8,335,127 B2 | 12/2012 | Tenghamn | |
| 8,427,901 B2 | 4/2013 | Lunde et al. | |
| 8,446,798 B2 | 5/2013 | Tenghamn | |
| 8,466,798 B2 | 6/2013 | Gado et al. | |
| 2003/0128628 A1 * | 7/2003 | Osborn | H04R 17/00 367/163 |
| 2007/0206441 A1 * | 9/2007 | Porzio | G10K 9/121 367/163 |
| 2010/0118646 A1 | 5/2010 | Tenghamn et al. | |
| 2010/0118647 A1 | 5/2010 | Tenghamn et al. | |
| 2010/0302900 A1 | 12/2010 | Tenghamn et al. | |
| 2010/0322028 A1 | 12/2010 | Tenghamn et al. | |
| 2014/0226439 A1 * | 8/2014 | Tenghamn | B06B 1/0276 367/15 |

OTHER PUBLICATIONS

HEXCEL, HexPly M9.1F/M9.6F Provisional Product Data Sheet, Oct. 2005. (2 pages).

HEXCEL, HexPly M9.6G Provisional Product Data Sheet, Mar. 2011. (3 pages).

* cited by examiner

BOW-SHAPED SPRING FOR MARINE VIBRATOR

CROSS-REFERENCE TO RELATED APPLICATIONS

This application claims the benefit of U.S. Provisional Application Ser. No. 61/921,929 filed Dec. 30, 2013 and titled "Bow-Shaped Spring Elements". The provisional application is incorporated by reference herein as if reproduced in full below.

BACKGROUND

This disclosure relates generally to the field of marine seismic surveying. In particular, this disclosure may have applications in, for example, marine seismic sources such as marine vibrators and spring members used therein.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Bow shaped" when used in conjunction with a spring member shall mean a member having a surface contour comprising portions with varying curvature, and, in particular, portions with curvatures of opposite algebraic sign (i.e. "positive" curvature and "negative" curvature). Mathematically curvature is conventionally expressed as a quantity having a numerical value and algebraic sign.

"Arc shaped" when used in conjunction with a spring member shall mean a member having every surface contour comprised of a curvature of a single algebraic sign (which may be either positive or negative depending on a selected sign convention).

"Exemplary" as used herein, means serving as an example, instance, or illustration." An embodiment described herein as "exemplary" is not necessarily to be construed as preferred or advantageous over other embodiments.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must).

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Figure 1:
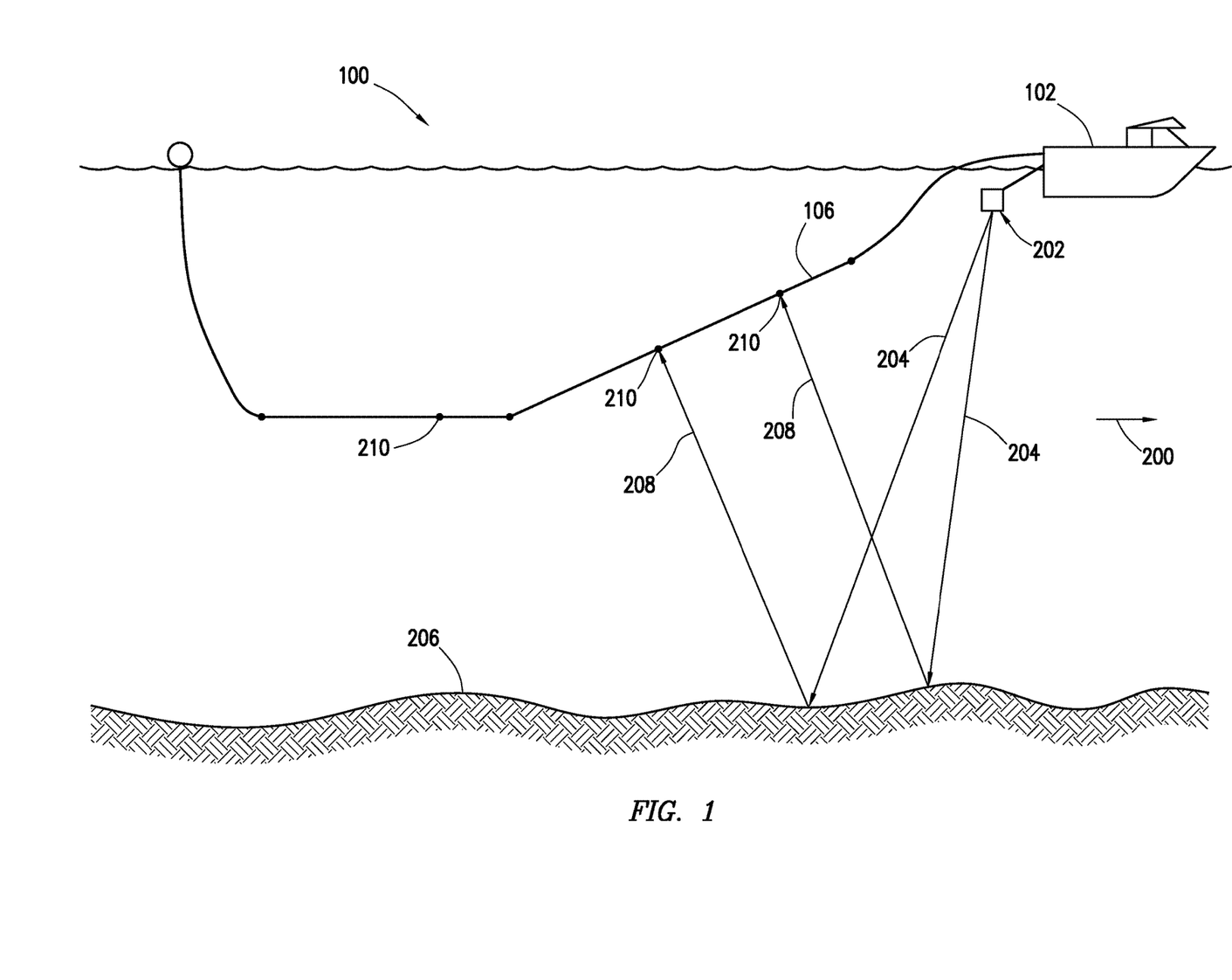
FIG. 1 shows a side elevation view of marine survey system in accordance with at least some embodiments.

To orient the reader and appreciate the principles subsequently disclosed herein turn now to FIG. 1. FIG. 1 shows a side elevation view of a marine survey system 100 in an operational configuration. Survey vessel 102 is shown towing a sensor streamer 106 in a direction indicated by arrow 200. In some embodiments the survey vessel 102 tows a seismic source 202 such as a marine vibrator, for example, which emits seismic waves in a downward direction toward the seafloor 206. The seismic source 202 may create waves defining propagating wave fronts, but so as not to unduly complicate the figure only the direction of travel of the wave fronts is shown by lines 204 (but still referred to as seismic waves 204). Seismic waves 204 may be reflected off the seafloor (and/or subsurface structures below the seafloor) in an upward direction as incident seismic waves 208 which intersect the sensor streamer at various sensor locations 210 creating signals in the various hydrophones, geophones, and/or accelerometers of the sensor streamer. For simplicity of illustration, only two paths are depicted in FIG. 1, while an actual seismic wave would define many paths originating at the seismic source 202, reflected off the seafloor and subsurface structures.

In a marine seismic survey, as described above, seismic waves may be produced by a marine vibrator. A marine vibrator, as describe further below in conjunction with FIGS. 2A, 2B, may include a driver coupled to a spring member that is further coupled to a shell that is in contact with the water body. According to some embodiments of this disclosure, bow-shaped spring members may be used. As described further hereinbelow, a bow-shaped spring member may have a more linear spring rate compared to the related art arc-shaped spring member. The linearity may provide a more dynamically stable marine vibrator, i.e. a marine vibrator with a response that is less dependent on force amplitude. Also the bow-shaped spring member may be more resistant to buckling and provide lower stresses compared to arc shaped spring members.

The bow-shaped spring members may be components of a spring assembly, which in turn may be a component of a marine vibrator. The spring assembly may provide the ability to transmit force from the driver to the shell of the marine vibrator and provide appropriate preselected resonant frequencies so as to obtain a desired sound pressure level (SPL) during seismic survey operations. In at least some embodiments, the preselected resonant frequencies may be in the range of 5 Hz to 100 Hz. In yet other embodiments, the preselected resonant frequencies may be in the range of 15 Hz to 27 Hz. And in still other embodiments the preselected resonant frequencies may be in the range of 0.1 Hz to 100 Hz.

Figure 2A:
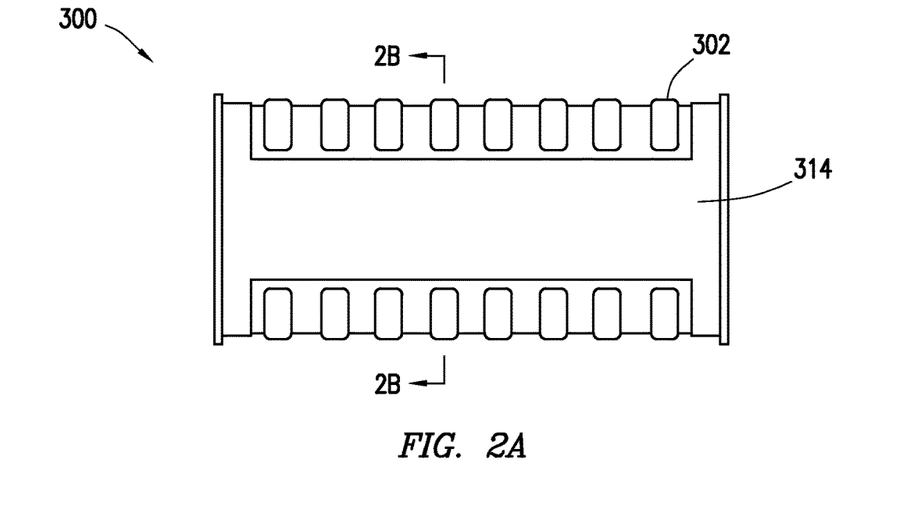
FIG. 2A shows a side elevation view of a marine vibrator in accordance with at least some embodiments.
Figure 2B:
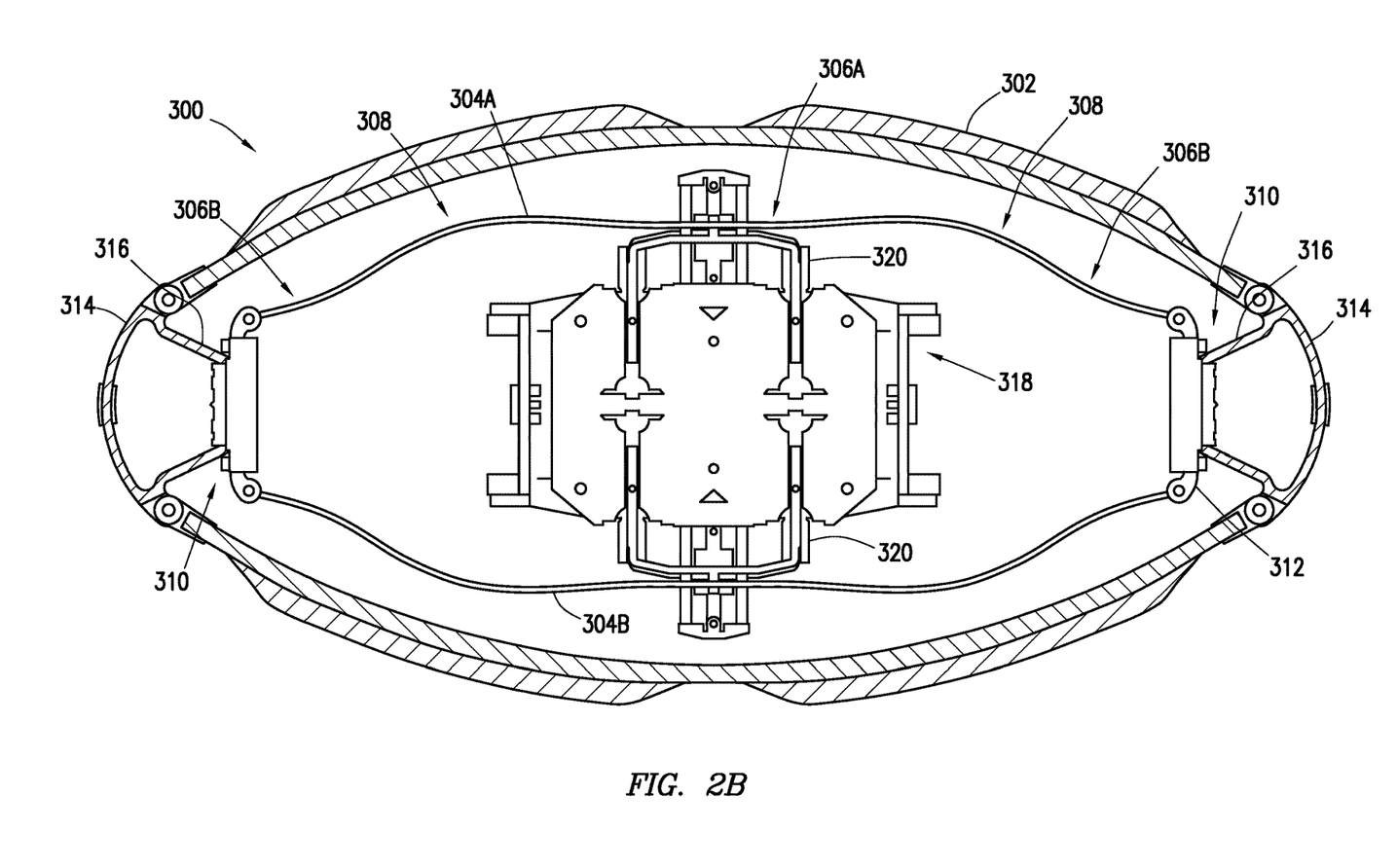
FIG. 2B shows a front elevation section through the marine vibrator of FIG. 2A in accordance with at least some embodiments.

Referring now to FIGS. 2A and 2B, there is shown, in two views, a marine vibrator 300 employing a bow-shaped spring member in accordance with at least some embodiments. FIG. 2A shows a side elevation view of marine vibrator 300 including shell 302. Outer portion 314 (of bracket members 310 described below) is more readily seen in FIG. 2B showing a front-elevation, transverse cross-sectional view through 2B-2B of marine vibrator 300. Visible in the cross-sectional view are bow-shaped spring members 304A, B. As more fully described below, a bow-shaped spring member 304 may have a medial portion 306A having curvature with a predetermined first algebraic sign (i.e., "positive" or "negative"), and two intermediate portions 306B having a curvature also with the first algebraic sign. Bow-shaped spring member 304 may have peripheral portions 308 disposed between medial portion 306A and the intermediate portions 306B. Peripheral portions 308 may have a curvature with a second algebraic sign opposite the first algebraic sign.

Bow-shaped spring members 304A, B may be pivotally connected at each end to a respective one of bracket members 310. Bracket members 310 may have an inner portion 312 which may be connected the spring members and an outer portion that may be pivotally attached to the shell. The inner portion 312 and outer portion 314 may be connected by arms 316. In operation, bow-shaped spring members 304 may be driven by a driver 318 via the action of armatures 320 which may comprise moving members of a linear motor. The motion of armatures 320 may be sinusoidal, but other periodic driving motion may also be used. In at least some embodiments, bow-shaped spring members 304A, B may be disposed in a configuration in which the bow-shaped spring member 304B is a mirror image of bow-shaped spring member 304A in a central plane perpendicular to the plane of FIG. 2B (that is, perpendicular to the front elevation) and bisecting marine vibrator 300 along a length thereof.

In at least some embodiments, bow-shaped spring members 304 may be comprised of a carbon fiber laminate. For example, bow-shaped spring members 304 may be fabricated by stacking lamina of unidirectional carbon fibers and bonded with epoxy resin. One example of such material which may be used is commercially available unidirectional carbon fiber material pre-impregnated with an epoxy matrix, which may also be referred to as "pre-pregs". An exemplary pre-preg that may be used in at least some embodiments is a Hexply pre-preg from Hexcel Corporation, Stamford, Conn., type M9.6. In other embodiments, fiber material comprised of glass fiber or aramid fiber may be used. A preselected stiffness may be obtained by varying the built-up thickness of the stack. For example, in at least some embodiments the thickness of bow-shaped spring member 304 may be in the range of 5-9 mm. Further, the preselected stiffness may be achieved by, along with the thickness, alternating the directions of the fibers comprising the stacked lamina. For example, in at least some embodiments a carbon fiber lamina stack may be comprised of ten layers having alternating directions of the fiber with orientations relative to an axis along the length of the bow-shaped spring member of 30°, −30°, 90°, 30°, −30°, −30°, 30°, 90°, −30°, and 30°. However, the principles disclosed herein are not confined to the exemplary embodiments having a laminated fiber construction or to a particular example laminated construction. Further, in yet other embodiments, bow-shaped spring member 304 may be formed from a metal, for example steel.

Figure 3A:
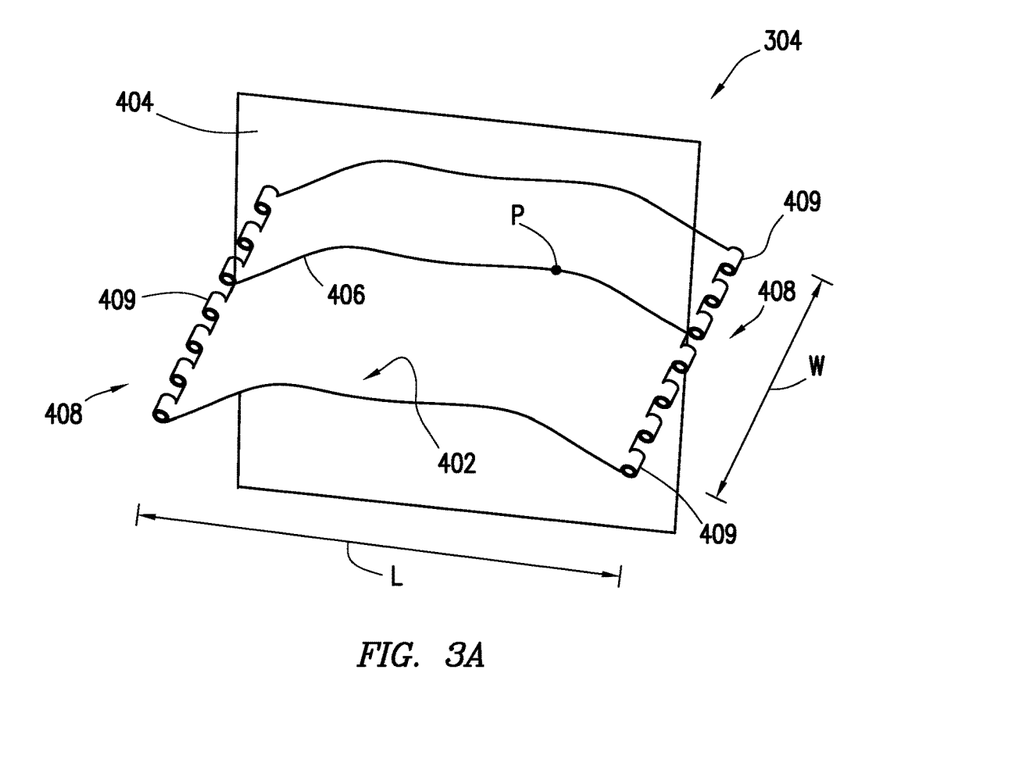
FIG. 3A shows a perspective view of a bow-shaped spring member in accordance with at least some embodiments.
Figure 3C:
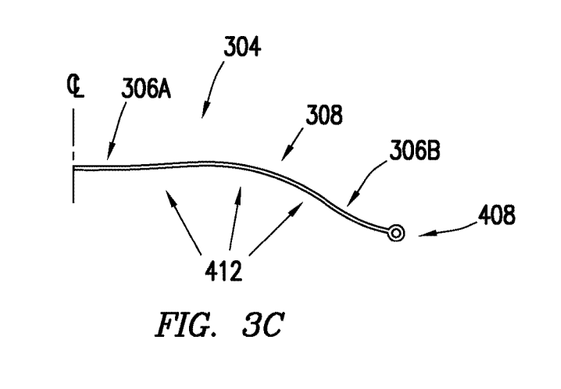
FIG. 3C shows a front elevation section through the bow-shaped spring member of FIG. 3A in accordance with at least some embodiments.
Figure 4:
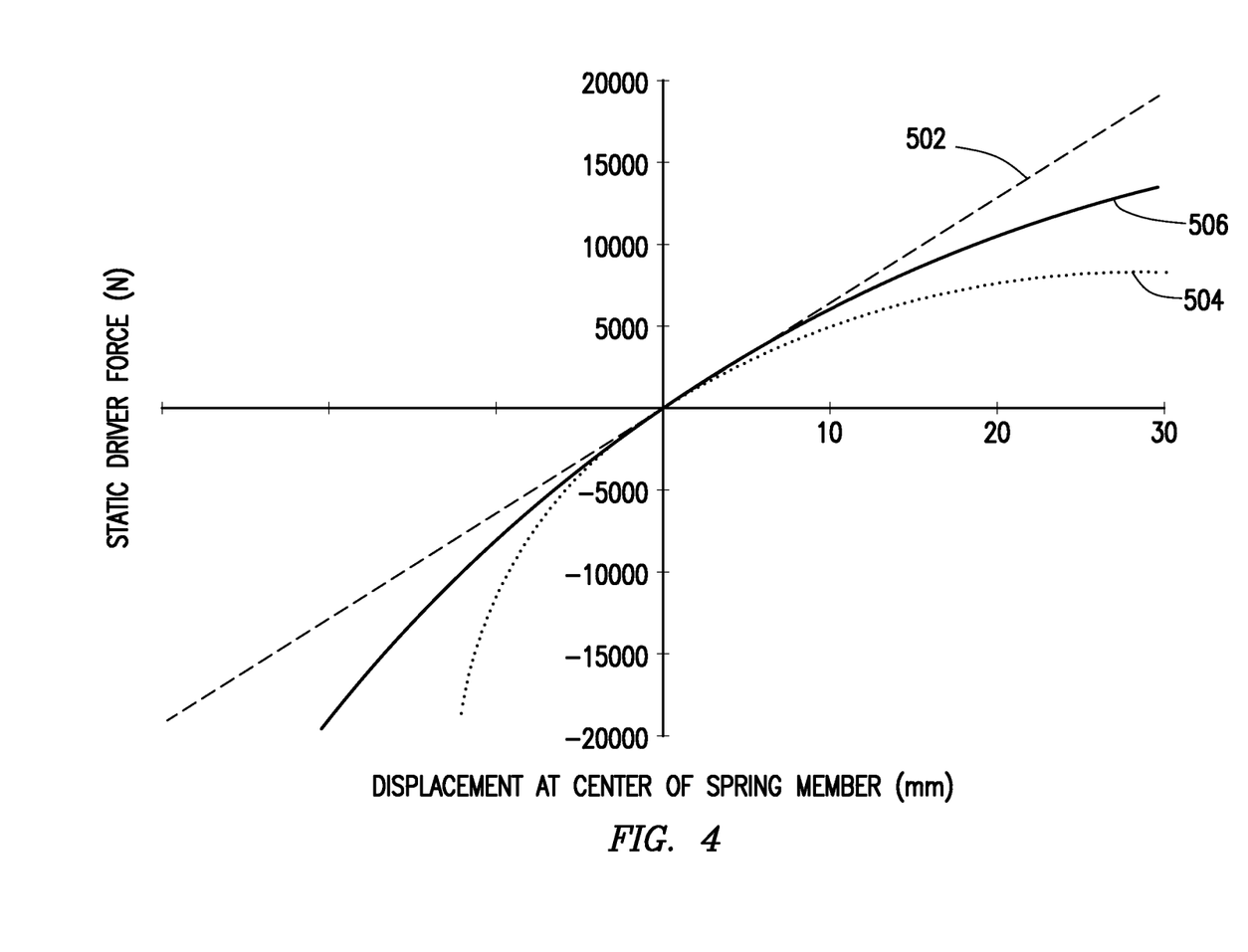
FIG. 4 shows a graph of the force versus displacement of a spring member in accordance with at least some embodiments.

FIG. 4 shows two views of a bow-shaped spring member 304 in accordance with at least some embodiments. FIG. 3A is a perspective view of spring member 304, and FIG. 3C front elevation view of the right half of spring member 304 as depicted in FIG. 3A. Considering first FIG. 3A, bow-shaped spring member 304 comprises a curved flexible structure including outer surface 402 defining a length, L, and width, W. In at least some embodiments, L may be about 1280 mm and W may be about 1600 mm. In other embodiments, L and W may have other values. The values of L and W may be comparable in some embodiments. For example, in some embodiments, the width W may be in the range of from 75% to 125% of the length L. In other embodiments, W may be in the range of from 65% to 135% of L. In still other embodiments, W may be in the range of from 50% to 150% of L.

A second, bottom, surface (e.g. inner surface 412 in FIG. 3C) which together with outer surface 402 defines a thickness of bow-shaped spring member 304 is not visible in FIG. 3A. A section through the spring member by transverse plane 404, which may be perpendicular to outer surface 402, defines a contour 406 thereon via the intersection of transverse plane 404 and outer surface 402. The curvature of outer surface 402 at a point P thereon may be determined as a curvature of a contour, such as contour 406 passing through P. In particular, in an embodiment of a bow-shaped spring member 304 having a curvature varying in a single dimension, for example, along the length thereof, transverse plane 404 may define a transverse section along the length of bow-shaped spring member 304. Further, in such exemplary embodiments, transverse sections defined by planes parallel to transverse plane 404 would define contours congruent to contour 406.

Figure 3B:
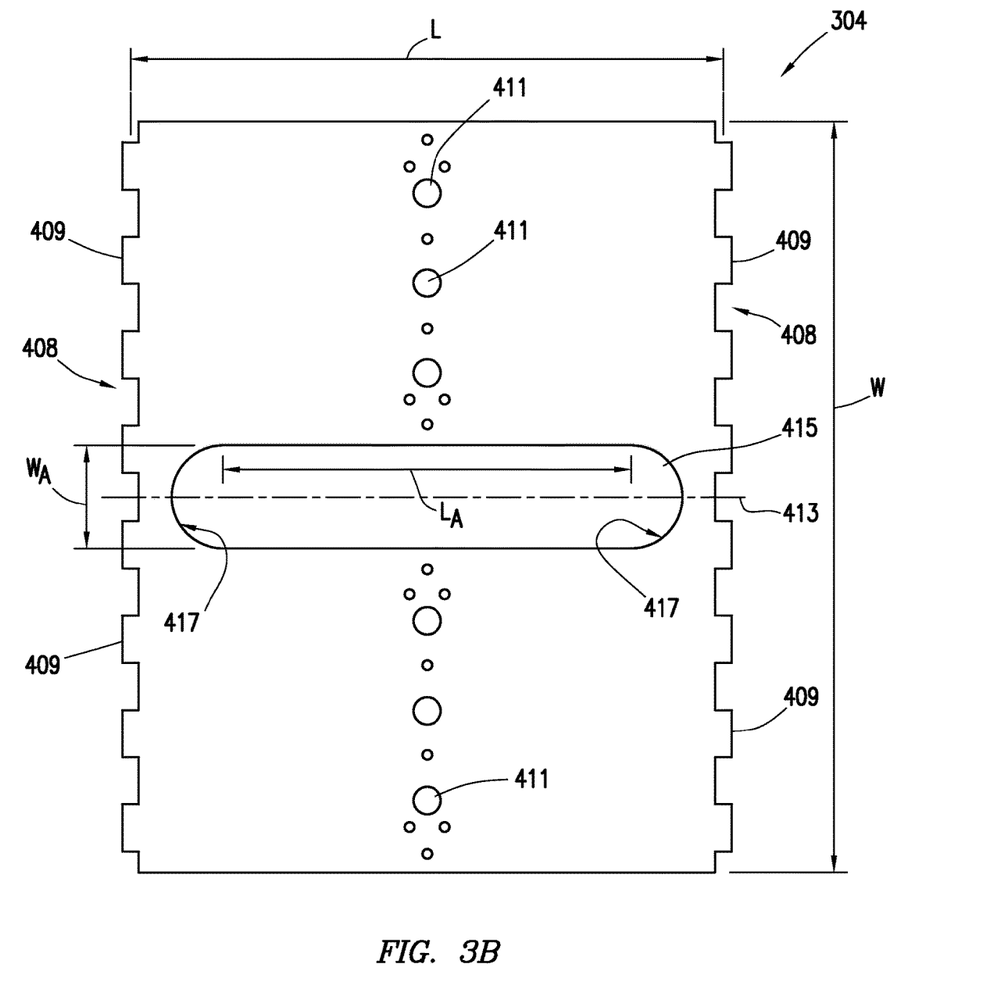
FIG. 3B shows a plan view of a bow-shaped spring member in accordance with at least some embodiments.

Still referring to FIG. 3A, disposed at ends of bow-shaped spring member 304 are hinge members 408 which may span the width, W thereof. Hinge members 408 may be configured to pivotally attach to inner portion 312 of bracket members 310 in FIG. 3, for example via knuckles 409. Hinge members 408 may also be seen in FIG. 3B showing a plan view of a bow-shaped spring member 304 in accordance with at least some embodiments. FIG. 3B also depicts the length L and width W. In the embodiment of FIG. 3B, bow-shaped spring member 304 is configured to attach, via holes 411, to a pair of drivers 318 disposed about a symmetry plane perpendicular to the page, the intersection therewith defining symmetry axis 413. A central hole 415 may be disposed within an embodiment of a bow-shaped spring member 304 as shown in the example in FIG. 3B. Further, central hole 415 may be disposed about symmetry axis 413, and may, in some embodiments have length $L_a$ of about 75% of the length L of bow-shaped spring member 304, or more. The width $W_a$ of central hole 415 may be less than or equal to about 14% of the width W of bow-shaped spring member 304. Central hole 415 may also comprise circular arc portions 417 which may have a radius of one-half of the width $W_a$ of central hole 415. In a bow-shaped spring member 304 configured to attach to a pair of drivers as in the exemplary embodiment in FIG. 3B, central hole 415 may help reduce non-uniformity of displacement of the center of bow-shaped spring member 304 when driven by drivers 318. Stated otherwise, the incorporation of central hole 415 in bow-shaped spring member 304 may help to symmetrize (i.e. help make more symmetrical) the stiffness of bow-shaped spring member 304 with respect to the symmetry axis 413 and drivers 318.

Turning now to FIG. 3C, there is shown therein, in a front elevation view, the right half of bow-shaped spring member 304. In the exemplary embodiment of bow-shaped spring member 304 in FIG. 4, the bow-shaped spring member 304 may be comprised of two portions symmetrically disposed about a plane perpendicular to the page and appearing as a center line in the view of FIG. 3C. In general, however, the principles disclosed herein are not limited to spring member embodiments that either possess curvature varying in only a single dimension or to embodiments symmetrically disposed about a center line or similar axis. Although not visible in the front elevation view of FIG. 3C, contour 406 may be congruent with the profile presented by the front elevation representation of bow-shaped spring member 304. In particular, the curvature of contour 406 at a point thereon may be represented by the curvature of the profile, defined by outer surface 402 (FIG. 3C) and inner surface 412, of the portion of bow-shaped spring member 304 in the front elevation view of FIG. 3C.

As described above, mathematically, the curvature of a contour on a surface is a signed quantity. In particular, the curvature is the signed amplitude of a unit vector perpendicular to the contour. That is, a curvature value possess' both a numerical value and an algebraic sign. This may be appreciated in the terminology "concave" and "convex" used to describe curved contours and surfaces and defined with respect to an "inside" as for example convex: having an outline or surface curved outward like the exterior of a circle or sphere; and concave: having an outline or surface that curves inward like the interior of a circle or sphere. To avoid having to reference a curvature to an "interior" or "exterior", mathematical definitions of curvature use signed values. However, there is not a unique way to attach a sign to a curvature, and the sign corresponding to a convex portion of a curved contour, say, may depend on a chosen sign convention. Nevertheless, whether a sign convention attaches a positive sign to a convex portion or, conversely a negative sign, a concave portion of that contour will have the opposite sign. Such alternation of signs is a consequence of the mathematics of curved contours, regardless of the sign convention adopted.

Returning to FIGS. 3A, C, in view of the foregoing, the curved regions of contour 406 as reflected in the profile of the bow-shaped spring member in FIG. 3C, may have curvatures of alternating sign, based on a preselected sign of one of the curved portions. Thus, for example, if the sign of the curvature of intermediate portion 306B is selected to be positive, then the sign of the curvature of peripheral portion 308 would be negative, and the sign of the curvature of medial portion 306A would also be positive. Conversely, if the sign of the curvature of intermediate portion 306B is selected to be negative, then the sign of the curvature of peripheral portion 308 would be positive, and the sign of the curvature of medial portion 306A would also be negative. In other words, if the curvature of intermediate portion 306B has a "first" sign (either positive or negative), then the curvature of peripheral portion 308 would have a "second" opposite the first sign, and the curvature of medial portion 306A would also have the first sign.

Figure 3D:
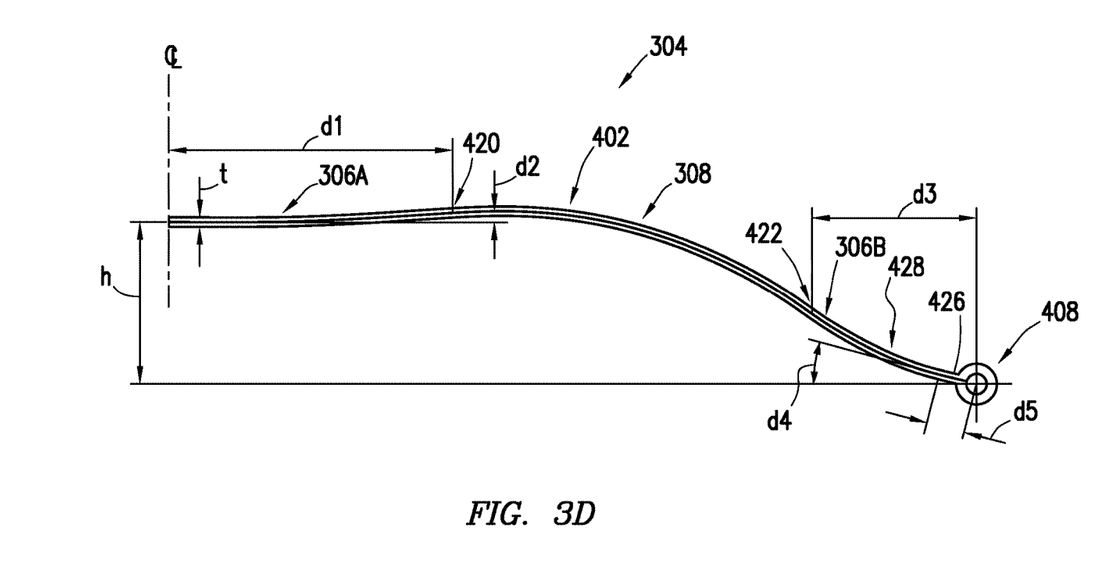
FIG. 3D shows a front elevation section through the bow-shaped spring member of FIG. 3A in accordance with at least some embodiments.

Several exemplary embodiments will now be described in conjunction with Table 1 and FIG. 3D.

TABLE 1

|  | d1 [mm] | d2 [mm] | d3 [mm] | d4 [°] | d5 [mm] | h [mm] | t [mm] | k [N/mm] |
|---|---|---|---|---|---|---|---|---|
| Example 1 | 225 | 9 | 130 | 15 | 30 | 128 | 6.77 | 26 |
| Example 2 | 350 | 9 | 130 | 15 | 30 | 128 | 7.77 | 40 |
| Example 3 | 225 | 25 | 130 | 15 | 30 | 128 | 7.83 | 41 |
| Example 4 | 225 | 9 | 230 | 15 | 30 | 128 | 6.08 | 19 |
| Example 5 | 225 | 9 | 130 | 5 | 30 | 128 | 6.58 | 24 |
| Example 6 | 225 | 9 | 130 | 15 | 100 | 128 | 6.53 | 24 |

Figure 3E:
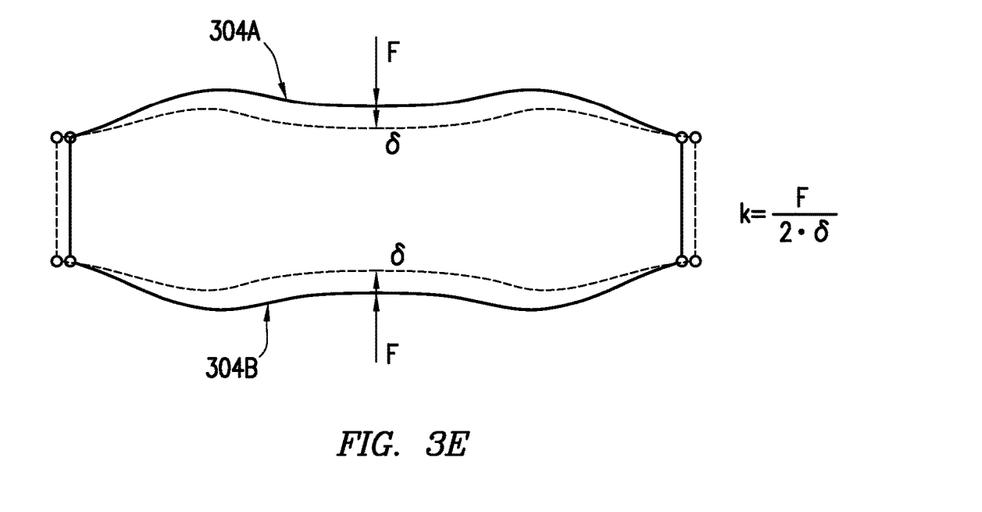
FIG. 3E shows a front elevation section through a pair of bow-shaped spring members in accordance with at least some embodiments.

As described above in conjunction with FIG. 3C, FIG. 3D represents half of a bow-shaped spring member 304 symmetric about a plane perpendicular to the page, visible as a centerline in the view of FIG. 3D. Six example embodiments having various dimensions as set forth in Table 1 are provided. Each exemplary embodiment in Table 1 has a height, h of 128 mm. Medial portion 306A adjoins peripheral portion 308 at an inflection line on outer surface 402, which inflection line appears as inflection point 420 in the view of FIG. 3D. The extent of medial portion 306A represented in the portion of bow-shaped spring member 304 in FIG. 3D is denoted d1, and is measured from the centerline to inflection point 420. In examples 1-6, two values of d1, 225 mm and 350 mm have been used. The height of peripheral portion 308 above the tangent to the surface of bow-shaped spring member 304 at the center line is denoted d2. Two values of d2 have been used in conjunction with examples 1-6, 9 mm and 25 mm. Peripheral portion 308 adjoins intermediate portion 306B at a second inflection line on outer surface 402, which inflection line appears as inflection point 422 in the view of FIG. 3D. Inflection point 422 lies a distance denoted d3 which is measured from a center of hinge member 408. A straight portion 426 joins hinge member 408 to intermediate portion 306B and is tangent to intermediate portion 306B at 428, defining a distance denoted d5. Straight portion 426 makes an angle denoted d4 with a horizontal direction. Two values of d4 have been used in conjunction with examples 1-6, 5° and 15°. The thickness, t, of examples 1-6 lie in the range from about 6-8 mm. The stiffness, k, of examples 1-6 lie in the range from 26-41 N/mm. The stiffness may be determined from the deflection, δ, of bow-shaped spring members 304 in response to an applied force, F, as shown in FIG. 3E, where the deflected position of bow shaped-spring members 304A, B is depicted by the dashed line. In terms of the force, F and deflection, δ, the stiffness, k, is given by k=F/2·δ. The dimensions and values of the parameters in the examples in Table 1 are illustrative and not limiting, and bow-shaped spring elements in accordance with the principles disclosed herein may have other dimensions as particular applications may, for example, dictate.

Figure 3F:
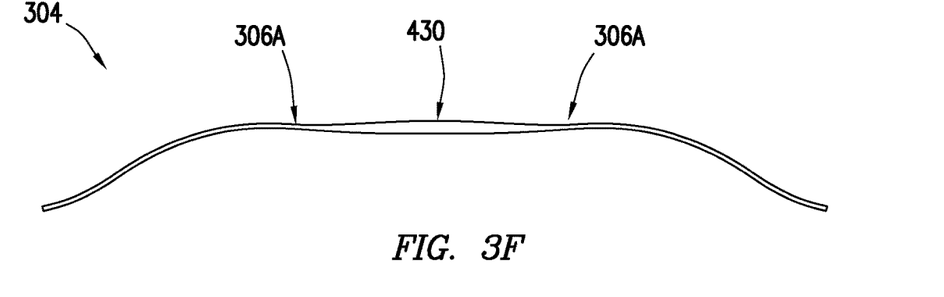
FIG. 3F shows a front elevation section through the bow-shaped spring member in accordance with at least some embodiments.
Figure 3G:
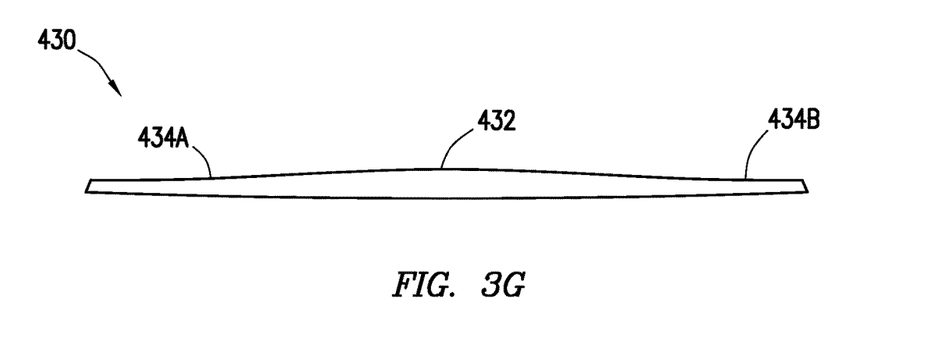
FIG. 3G shows a portion of the bow-shaped spring member of FIG. 3F in accordance with at least some embodiments.

Although the illustrated embodiments of bow-shaped spring member 304 in FIGS. 3A-3E are shown having a uniform thickness, in at least some embodiments, the thickness need not be uniform. FIGS. 3F, 3G show a bow-shaped spring member 304 having a portion 430 with a varying thickness along a length thereof. A central region 432 of portion 430 of the exemplary embodiment in FIGS. 3F, 3G, has a greatest thickness. The thickness then diminishes in tapering regions 434A, B, which adjoin medial portions 306A (not shown in FIG. 3G). In at least some embodiments, central region 432 may have a thickness between 10 mm and 12 mm. However this range of thickness is exemplary and not limiting and other thicknesses may be used in accordance with a particular application of a bow-shaped spring member.

To further understand the principles of the disclosure, refer now to FIG. 4 showing a graph of static driving force (displayed on the ordinate or "vertical" axis) and the displacement at the center of a spring member having ends fixed laterally (displayed on the abscissa, or "horizontal" axis). The fixed-end boundary condition may reasonably approximate the condition of a spring comprised of bow-shaped spring members near the resonance (described more fully below) of the spring. Graph 502 (dashed line) is a plot of an ideal elastic spring member obeying the so-called Hooke's law in which the displacement of the spring member and the load or driving force thereon, are linearly related. Graph 504 (dotted line) displays the static driving force versus displacement at the center for a related-art arc-shaped spring member. Similarly, graph 506 (solid line) displays the static driving force versus displacement at the center for a bow-shaped spring member in accordance with at least some embodiments. For the bow-shaped spring element, the static driving force versus center displacement for the bow-shaped spring member is expected to track the linear spring rate over a larger range of force-displacement values, and in the non-linear regime deviates less from the linear spring rate. Note that the spring rate may also be referred to as the stiffness. In the exemplary embodiment of FIG. 5, the spring rate in the non-linear regime at the maximum displacement of 30 mm shown for an exemplary bow-shaped spring member is approximately 63% of the linear spring rate, whereas, for the arc-shaped spring member, the comparable spring rate is approximately 38% of the linear spring rate. The difference in behavior of a bow-shaped spring member and an arc-shaped spring member may be attributed to the dominance of bending stresses over membrane stresses in a bow-shaped spring member as compared to an arc-shaped spring member.

When deployed, the marine vibrator comprised of a spring and shell coupled thereto as described above in conjunction with FIGS. 3A, 3B may exhibit a plurality of mechanical resonant frequencies, or simply resonances. The resonances may be beneficially employed to provide the SPL required for a particular marine seismic survey. In particular, a first resonance may be associated with a "spring-mass" system comprised of the shell and the mass of the water body in the vicinity of the shell when the marine vibrator is deployed in the sea. Thus, the first resonance may be defined by the mass of the water body and the stiffness, or spring rate, of the shell. When deployed during marine seismic survey operations, the first resonance may be in the range of 3 Hz to 12 Hz in at least some embodiments of a marine vibrator. A second resonance, which may be higher in frequency than the first resonance, may be associated with the spring assembly and the driver coupled thereto. The "spring-mass" system is comprised of the bow-shaped spring member 304, and a driver moving mass, for example armature 320. The second resonance may thus be defined by the mass of the armature and stiffness of the spring member employed in the spring assembly. Linear stiffness of the bow-shaped spring member may be in the range of about 20-50 N/mm, and more particularly in the range of about 25-42 N/mm.

Figure 5:
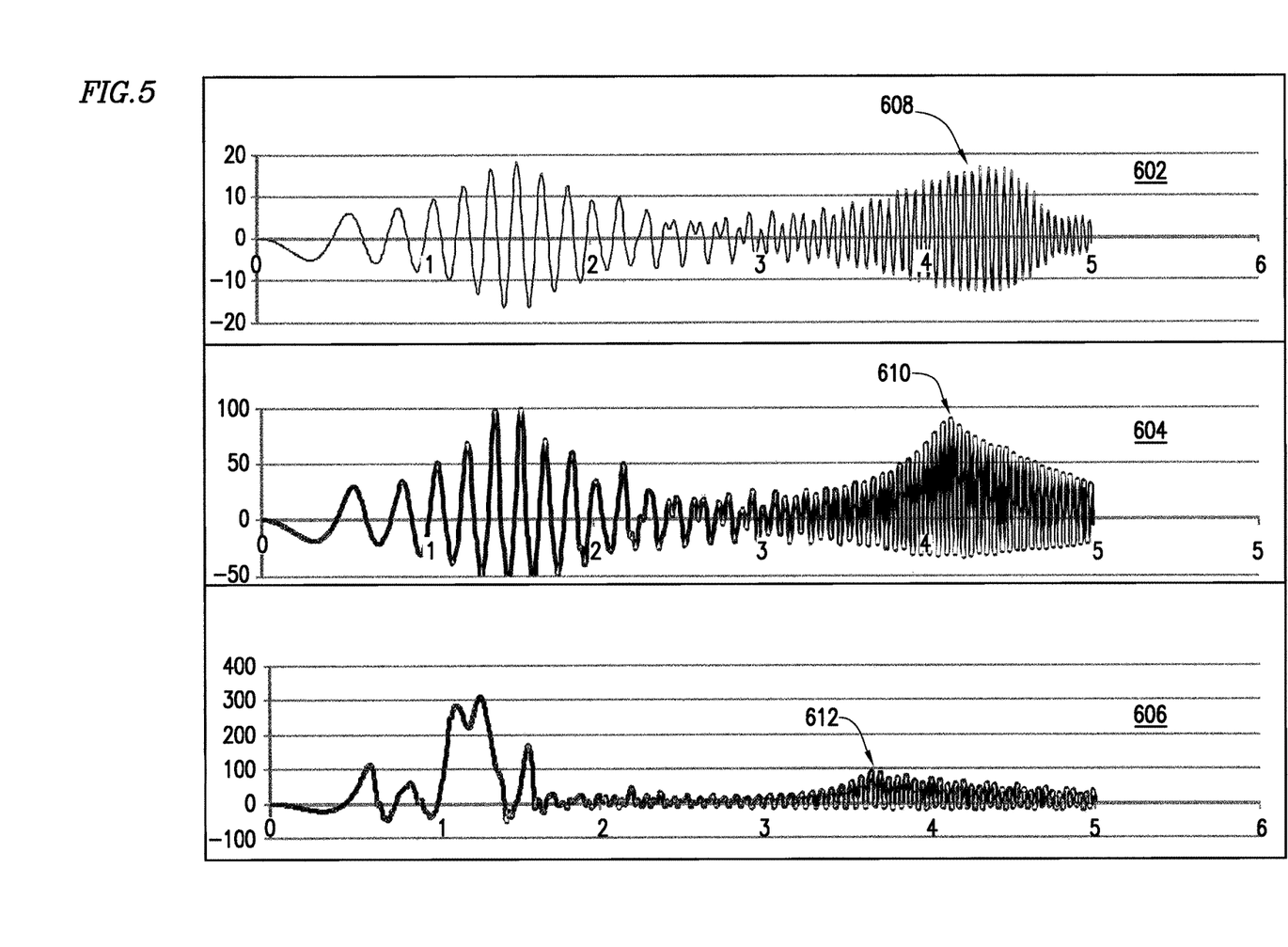
FIG. 5 shows graphs of displacements as a function of time of driven spring members in accordance with at least some embodiments.

The non-linearity of the spring member, as described above, may lead to a driver force-amplitude-dependent response. This is illustrated in the graphs of FIG. 5. The graphs plot the displacement of the center a driven spring member as a function of time, as generated using a system dynamics finite element analysis ("FEA") model. Three graphs are shown in FIG. 5; graphs 602 and 604 correspond to a bow-shaped spring member in accordance with at least some embodiments. Graph 606 corresponds to an arc-shaped spring member. Graph 602 plots the displacement versus time for a driving force of 2 kN and graph 604 a driving force of 8 kN. The driving frequency was linearly chirped from 5 Hz to 22 Hz at a linear rate of 5 Hz/sec. Thus, the time displayed in the abscissa may be translated into a frequency (the frequency values on the abscissa then spanning the range 0-25 Hz). At a driving force of 2 kN, graph 602, the non-linearity is less apparent in the response of the system, as reflected, for example in the displacement amplitude oscillation near the second resonance, 608, being more nearly symmetric about the abscissa. By contrast, graph 604 displays an apparent asymmetry about the abscissa. From the graphs it may be seen that the second resonance may shift depending on force amplitude. In graph 604, at 610, a downward frequency shift of the resonance of about 2 Hz may be seen. The downward shift in frequency appears on the time axis as a shift earlier in time of approximately 0.4 seconds from the aforesaid frequency chirp rate. As described above, non-linearity is larger for an arc-shaped spring member and, for an exemplary embodiment, at 8 kN a frequency shift of about 4 Hz may be observed, graph 606 at 612. At 8 kN, the arc-shaped spring member was close to buckling, as next described.

Figure 6:
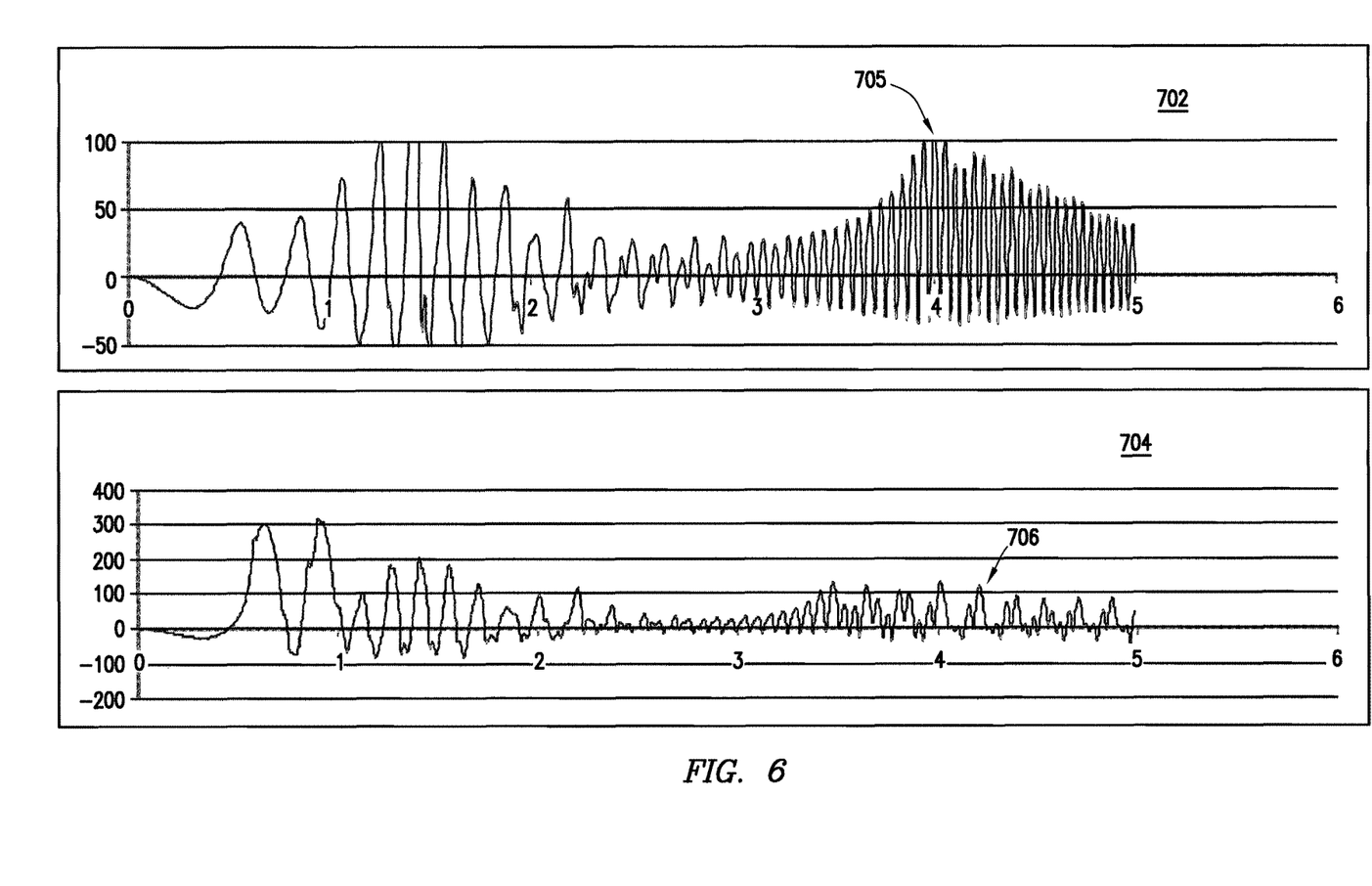
FIG. 6 shows graphs of displacements as a function of time of driven spring members in accordance with at least some embodiments.

According to some embodiments, a buckling load of approximately 9 kN may be expected. However, in some embodiments a driving force in excess of 9 kN may be used to obtain the desired acoustic performance, and so the risk of buckling may be significant. Buckling may have several consequences: buckling/snap through may lead to failure and/or loss of acoustic performance; and, the second resonance may be less predictable and also force-dependent. FIG. 6 shows graphs of the displacement of the center of exemplary spring members as a function of time, similar to FIG. 5. However, In FIG. 6, the driving force is 9.7 kN for both graphs 702 and 704. Graph 702 displays the center displacement of an exemplary driven bow-shaped spring member as a function of time. Graph 704 is a similar display for a related-art arc-shaped spring member. The driving force is, as in FIG. 5, swept from 5-25 Hz at a rate of 5 Hz/sec. The asymmetrical oscillation of the center displacement near the second resonance, 705, is indicative of the non-linearity of the stiffness of the bow-shaped spring member embodiment, as discussed in conjunction with FIG. 5. However, the graph does not exhibit the irregularity indicative of buckling. By contrast, graph 704, corresponding to the arc-shaped spring member, exhibits a high harmonic, sawtooth-like behavior, 706, in the neighborhood of the linear second resonance indicative of buckling. The contrasting behavior of the bow-shaped and arc-shaped spring member embodiments seen in Graphs 702 and 704 comports with the non-linear behavior of the stiffness as discussed above in conjunction with FIG. 5.

Figure 7:
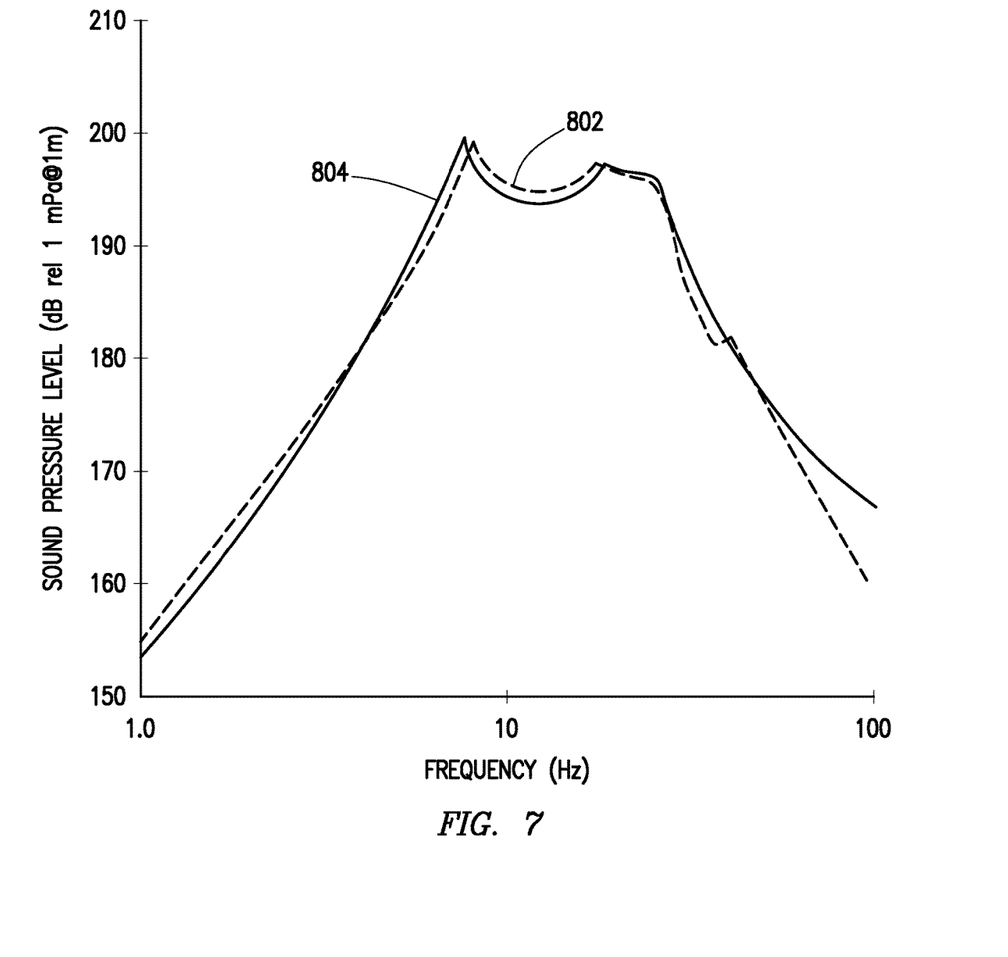
FIG. 7 shows graphs of sound pressure level versus frequency of a marine vibrator in accordance with at least some embodiments.

When a spring member is incorporated in a marine vibrator, the combined mechanical system comprised of the spring member, shell and driver armature exhibits resonances, as described hereinabove. The resonances may be exploited to achieve a desired SPL within the constraints set by, for example, the available driving force and the acoustic frequency band of interest. In at least some embodiments, the driving force may be in the range of 2 kN to 12 kN. FIG. 7 shows graphs of SPL as a function of frequency for exemplary embodiments of a deployed marine vibrator. The graphs are based on a linear model. Graph 802 (dashed line) depicts a SPL-frequency curve for an embodiment including a related-art arc-shaped spring member and graph 804 (solid line) is a plot of SPL versus frequency for an exemplary bow-shaped spring member in accordance with the principles disclosed herein. In the exemplary embodiment of FIG. 7, the first resonance is about 7 Hz and the second resonance about 22 Hz. Between the resonances, the SPL is about 0.9 decibels (dB) lower for the bow-shaped spring member, as seen in graph 804. This reduction in SPL between the resonances may be attributed to the increased stiffness of the bow-shaped spring member embodiment. In the frequency band in the vicinity of and between the resonances, the SPL may be in the range of about 190 dB to 200 dB referred to 1 micropascal (pPa) at 1 m.

In an embodiment of a marine vibrator having a limited driver displacement, the buckling risk may be reduced. Nevertheless, as described above, the nonlinear behavior of an arc-shaped spring member may be pronounced, making the dynamic response less predictable, which may be reflected in added complexity in the driver controller. Conversely, a bow-shaped spring member in accordance with the principles of the exemplary embodiments disclosed herein the buckling resistance may be much higher compared to the arc shape, and the nonlinear force-deflection characteristics may be reduced. As a consequence the dynamic response may be less force amplitude dependent.

Figure 8:
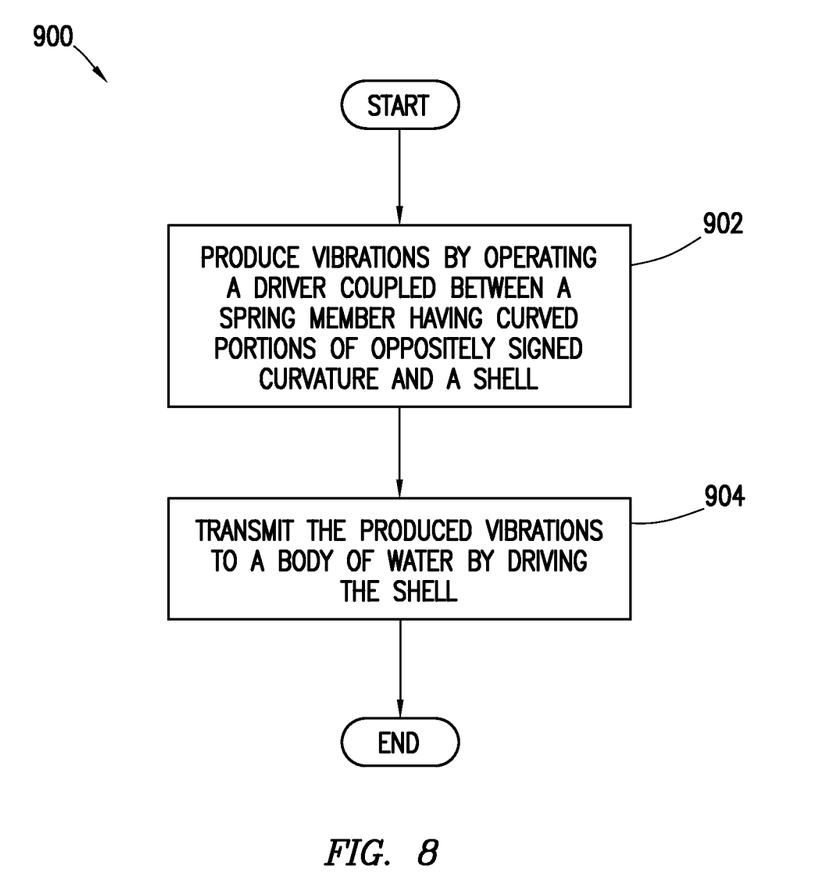
FIG. 8 shows a flowchart of a method in accordance with at least some embodiments.

Refer now to FIG. 8 showing a flow chart of a method 900 for generating seismic waves in accordance with at least some embodiments. In block 902, vibrations are produced by operating a driver coupled between a bow-shaped spring member having portions of oppositely-signed curvature and a shell. The produced vibrations are transmitted to body of water by driving the shell, block 904.

References to "one embodiment", "an embodiment", "a particular embodiment", "exemplary embodiment" and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, a bow-shaped spring member may incorporate a central straight section to facilitate attachment to the driver. It is intended that the following claims be interpreted to embrace all such variations and modifications.

What is claimed is:

1. A marine vibrator comprising:
   a shell configured to transmit vibrations to a body of water;
   a driver coupled between at least one bow-shaped spring member and the shell, the driver is configured to drive vibrations of the bow-shaped spring member; and
   the at least one bow-shaped spring member is configured to transmit the vibrations to the shell;
   the at least one bow-shaped spring member comprises:
      an outer surface;
      an inner surface, the outer and inner surfaces defining a thickness of the spring member;
      first and second hinge members disposed on opposite ends of the bow-shaped spring member;
      a length defined between the first hinge member and the second hinge member;
      a width defined along the first hinge member, the width in a range of from 50% to 150% of the length;
      a contour on the outer surface defined by a perpendicular section along the length thereof;
         the contour with the bow-shaped spring member in a rest condition without the vibrations comprises:
            a medial portion having a curvature with a first algebraic sign;
            first and second intermediate portions abutting respective first and second hinge members, the first and second intermediate portions having a curvature with the first algebraic sign; and
            first and second peripheral portions disposed between respective first and second intermediate portions and the medial portion, the first and second peripheral portions having a curvature with a second algebraic sign opposite the first algebraic sign.

2. The marine vibrator of claim 1 further comprising a bracket having an inner portion and an outer portion, wherein the outer portion is pivotally coupled to an end of the shell and the inner portion is pivotally coupled the at least one bow-shaped spring member at one of the first and second hinge members.

3. The marine vibrator of claim 1 wherein:
   the driver comprises an armature coupled to the at least one bow-shaped spring member, and
   the at least one bow-shaped spring member comprises a stiffness wherein the vibrations exhibit a resonance in a predetermined range when the stiffness is combined with a mass of the armature.

4. The marine vibrator of claim 3 wherein the predetermined range is 15 Hz to 27 Hz.

5. The marine vibrator of claim 1 wherein the at least one bow-shaped spring member is comprised of material selected from the group consisting of:

a carbon fiber;
an aramid fiber;
a glass fiber; and
steel.

6. The marine vibrator of claim 5 wherein the carbon fiber material comprises an epoxy matrix pre-impregnated carbon fiber material.

7. The marine vibrator of claim 1 wherein the at least one bow-shaped spring member comprises a first bow-shaped spring member and a second bow-shaped spring member, the first and second bow-shaped spring members disposed about a central plane bisecting the marine vibrator along a length thereof, the first and second bow-shaped spring members having a mirror image relationship about the central plane.

8. The marine vibrator of claim 1 wherein a stiffness of the at least one bow-shaped spring member is in the range of 20 N/mm to 50 N/mm.

9. The marine vibrator of claim 1 wherein the at least one bow-shaped spring member further comprises a central hole disposed about a symmetry axis of the bow-shaped spring member, the central hole for symmetrizing a stiffness of the bow-shaped spring member about the symmetry axis.

10. A method, comprising:
actuating a marine vibrator in a body of water, the actuating by
producing vibrations by operating an driver coupled to at least one bow-shaped spring member, and
transmitting the produced vibrations to the body of water by driving a shell;
wherein the at least one bow-shaped spring member is coupled between the driver and the shell and the at least one bow-shaped spring member comprises:
an outer surface;
an inner surface, the outer and inner surfaces defining a thickness of the bow-shaped spring member;
first and second hinge members disposed on opposite ends of the bow-shaped spring member;
a length defined between the first hinge member and the second hinge member;
a width defined along the first hinge member, the width in a range of from 50% to 150% of the length;
a contour on the outer surface defined by a perpendicular section along the length thereof;
wherein the contour with the bow-shaped spring member in a rest condition without the vibrations comprises:
a medial portion having a curvature with a first algebraic sign;
first and second intermediate portions abutting respective first and second hinge members, the first and second intermediate portions having a curvature with the first algebraic sign; and
first and second peripheral portions disposed between respective first and second intermediate portions and the medial portion, the first and second peripheral portions having a curvature with a second algebraic sign opposite the first algebraic sign.

11. The method of claim 10 wherein the vibrations transmitted to the body of water have a sound pressure level in the range of 190 to 200 dB referred to 1 µPa at one meter.

12. The method of claim 10 wherein the marine vibrator exhibits a first resonant frequency in a range of 3 Hz to 12 Hz determined by a stiffness of the shell and a mass of water disposed about the shell, and a second resonant frequency in the range of 15 Hz to 27 Hz determined by a stiffness of the at least one bow-shaped spring member and an armature of the driver coupled to the at least one bow-shaped spring member.

13. The method of claim 10 wherein the driver generates a force in the range of 2 kN to 12 kN on the at least one bow-shaped spring member.

14. The method of claim 10 wherein the at least one bow-shaped spring member further comprises a central hole disposed about a symmetry axis of the bow-shaped spring member, the central hole for symmetrizing a stiffness of the bow-shaped spring member about the symmetry axis.

15. A bow-shaped spring member comprising:
an outer surface;
an inner surface, the outer and inner surfaces defining a thickness of the bow-shaped spring member;
first and second hinge members disposed on opposite ends of the bow-shaped spring member;
a length defined between the first hinge member and the second hinge member;
a width defined along the first hinge member, the width in a range of from 50% to 150% of the length;
a contour on the outer surface defined by a perpendicular section along the length thereof, the contour with the bow-shaped spring member in a rest condition without vibrations comprising:
a medial portion having a curvature with a first algebraic sign;
first and second intermediate portions abutting respective first and second hinge members, the first and second intermediate portions having a curvature with the first algebraic sign; and
first and second peripheral portions disposed between respective first and second intermediate portions and the medial portion, the first and second peripheral portions having a curvature with a second algebraic sign opposite the first algebraic sign.

16. The bow-shaped spring member of claim 15 wherein the bow-shaped spring member is comprised of carbon fiber.

17. The bow-shaped spring member of claim 15 wherein the bow-shaped spring member, when coupled to a moving mass of a driver configured to drive the bow-shaped spring member, has a resonance in a preselected range.

18. The bow-shaped spring member of claim 17 wherein preselected range is 5 Hz to 100 Hz.

19. The bow-shaped spring member of claim 17 wherein the preselected range is 15 Hz to 27 Hz.

20. The bow-shaped spring member of claim 15 wherein the hinge members are configured to pivotally attach to a respective bracket configured to attach to a shell of a marine vibrator.

21. The bow-shaped spring member of claim 15 wherein the bow-shaped spring member has a buckling load of not less than twenty kilo-Newtons (20 kN).

22. The bow-shaped spring member of claim 15 further comprising a stiffness in the range of 20 N/mm to 50 N/mm.

23. The bow-shaped spring member of claim 15 wherein at least one of the first and second hinge members comprise a plurality of knuckles.

* * * * *